(12) United States Patent
Crombez et al.

(10) Patent No.: US 9,720,411 B2
(45) Date of Patent: Aug. 1, 2017

(54) AUTONOMOUS DRIVING SENSING SYSTEM AND METHOD

(71) Applicant: Ford Global Technologies, LLC, Dearborn, MI (US)

(72) Inventors: Dale Scott Crombez, Livonia, MI (US); Thomas Edward Pilutti, Ann Arbor, MI (US); Matt Y. Rupp, Canton, MI (US); Roger Arnold Trombley, Ann Arbor, MI (US); Andrew Waldis, Orion Township, MI (US); Peter Francis Worrel, Troy, MI (US); Wilford Trent Yopp, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 70 days.

(21) Appl. No.: 14/189,760

(22) Filed: Feb. 25, 2014

(65) Prior Publication Data

US 2015/0241878 A1 Aug. 27, 2015

(51) Int. Cl.
*G05D 1/00* (2006.01)
*G05D 1/02* (2006.01)
(Continued)

(52) U.S. Cl.
CPC ........... *G05D 1/0088* (2013.01); *B60W 30/12* (2013.01); *B60W 30/143* (2013.01);
(Continued)

(58) Field of Classification Search
USPC ....................................................... 701/29.2
See application file for complete search history.

(56) References Cited

U.S. PATENT DOCUMENTS 5,369,591 A 11/1994 Broxmeyer
5,774,069 A 6/1998 Tanaka et al.
(Continued)

FOREIGN PATENT DOCUMENTS

GB 2433791 7/2007
JP 2008290680 12/2008
(Continued)

OTHER PUBLICATIONS

Joseph B. White, "Auto Makers Accelerate Efforts to Develop Self-Driving Cars", Sep. 10, 2013, online.wsj.com/article/SB10001424127887323864604579067100731362272.html.
(Continued)

*Primary Examiner* — Shelley Chen
(74) *Attorney, Agent, or Firm* — Frank A. MacKenzie; Bejin Bieneman PLC

(57) ABSTRACT

A computer in a vehicle is configured to operate the vehicle in at least one of an autonomous and a semi-autonomous mode. The computer is further configured to detect at least one condition of a roadway being traveled by the vehicle, the condition comprising at least one of a restricted lane, a restricted zone, a construction zone, and accident area, an incline, a hazardous road surface. The computer is further configured to determine at least one autonomous action based on the condition, the at least one autonomous action including at least one of altering a speed of the vehicle, controlling vehicle steering, controlling vehicle lighting, transitioning the vehicle to manual control, and controlling a distance of the vehicle from an object.

20 Claims, 5 Drawing Sheets

(51) Int. Cl.
*B60W 50/08* (2012.01)
*B60W 30/12* (2006.01)
*B60W 30/14* (2006.01)
*B60W 30/16* (2012.01)
*B60W 50/00* (2006.01)

(52) U.S. Cl.
CPC ............ *B60W 30/16* (2013.01); *B60W 50/08* (2013.01); *G05D 1/0246* (2013.01); *G05D 1/0259* (2013.01); *G05D 1/0289* (2013.01); *B60W 2050/009* (2013.01); *B60W 2050/0095* (2013.01)

(56) References Cited

U.S. PATENT DOCUMENTS

| | | |
|---|---|---|
| 6,151,539 A | 11/2000 | Bergholz et al. |
| 2008/0162027 A1 | 7/2008 | Murphy et al. |
| 2012/0083959 A1 | 4/2012 | Dolgov et al. |
| 2012/0101654 A1 | 4/2012 | Samples et al. |
| 2012/0310465 A1 | 12/2012 | Boatright et al. |
| 2014/0032017 A1 | 1/2014 | Anderson et al. |

FOREIGN PATENT DOCUMENTS

| | | |
|---|---|---|
| JP | 2009069117 | 4/2009 |
| WO | 2014085121 | 6/2014 |

OTHER PUBLICATIONS

GB Search Report dated Jul. 1, 2015 (5 pages).

AUTONOMOUS DRIVING SENSING SYSTEM AND METHOD

BACKGROUND

A vehicle, particularly a vehicle being operated autonomously or semi-autonomously, may obtain data concerning surrounding conditions via a variety of mechanisms, e.g., sensors or the like included in the vehicle. Sensor data can provide information concerning environmental conditions, edges of a road or lanes in a road, etc., and can be used to formulate an appropriate speed for a vehicle, an appropriate path for a vehicle, etc. However, existing vehicle sensor data are subject to limitations with respect to information that may be determined therefrom. For example, vehicle sensors may not be aware of upcoming construction zones, accident zones, changes in speed limits, changes in available roadway lanes, etc. Accordingly, mechanisms for augmenting vehicle sensor data are needed.

DRAWINGS

DESCRIPTION

Introduction

Figure 1:
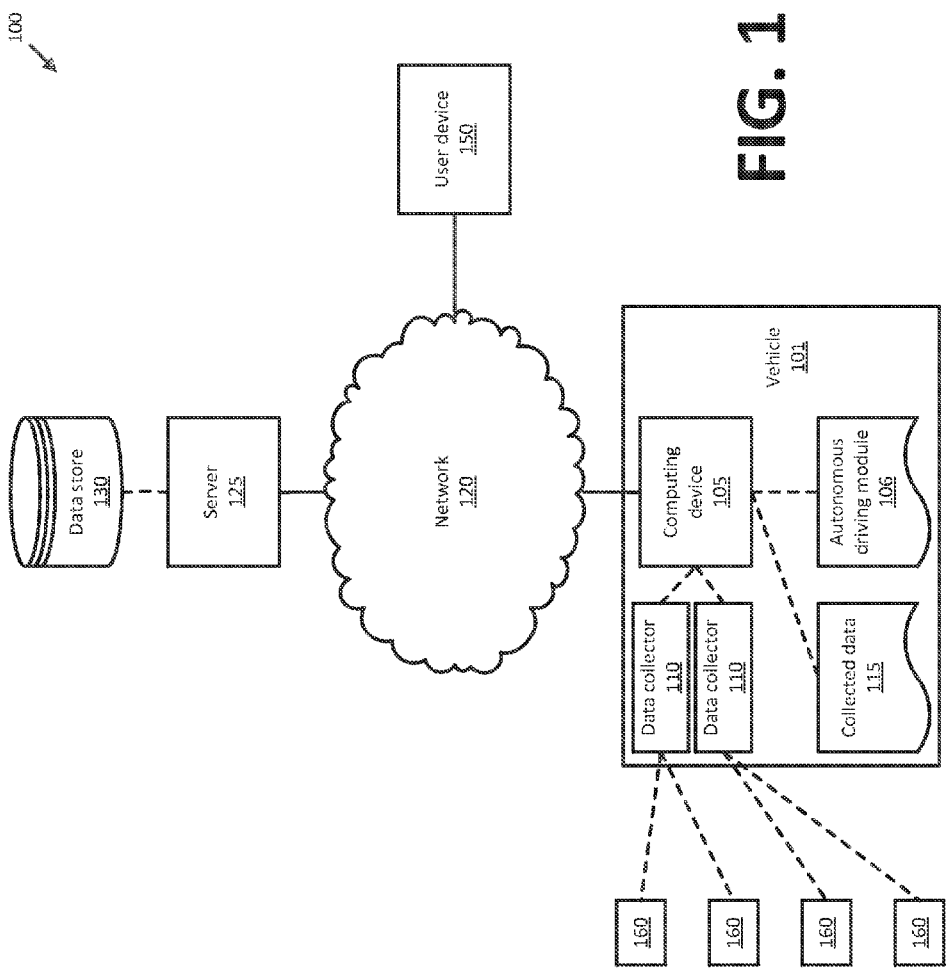
FIG. 1 is a block diagram of an exemplary autonomous vehicle sensing system.
Figure 2:
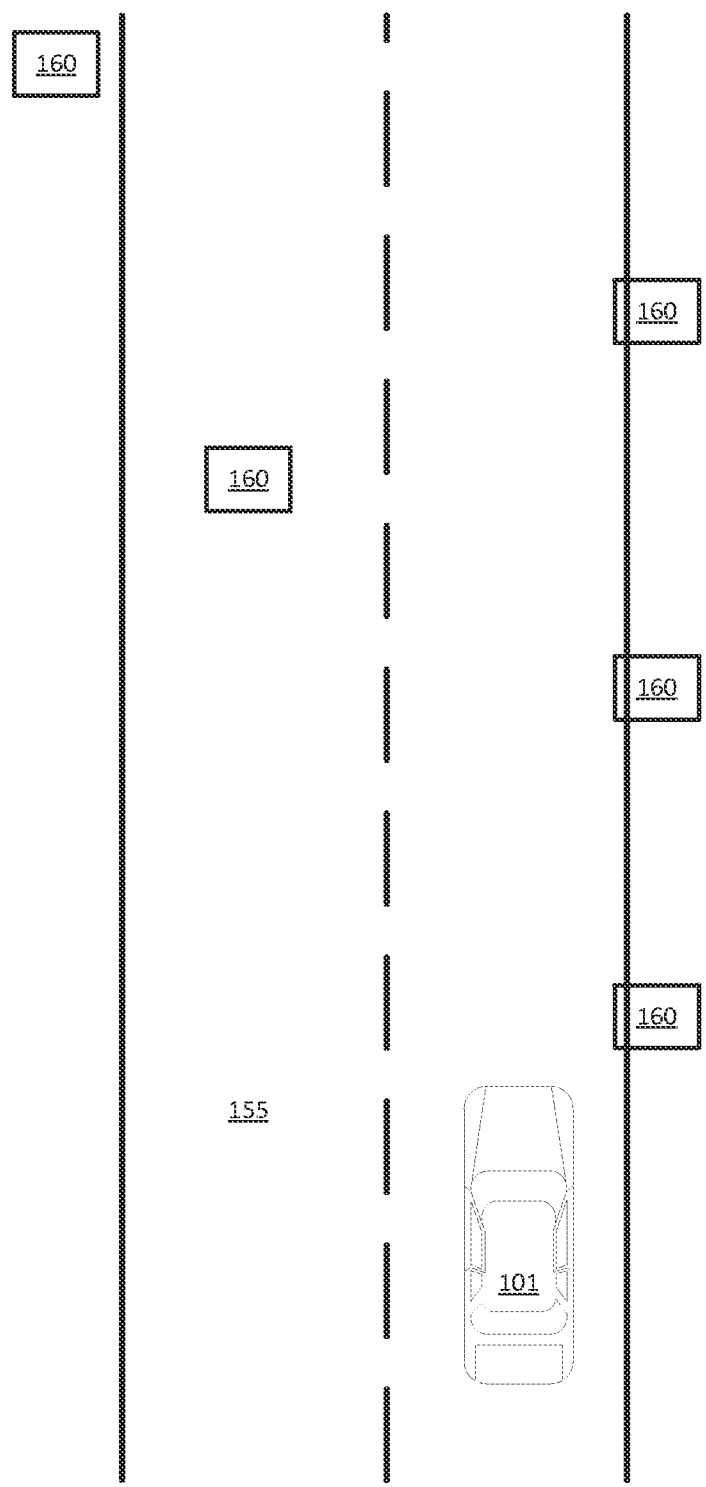
FIG. 2 is a block diagram of a vehicle roadway including sensor markers.

FIG. 1 is a block diagram of an exemplary autonomous vehicle system 100 that includes a vehicle 101 provided with one or more sensor data collectors 110 that operate in conjunction with one or more sensor markers 160 proximate to a roadway 155 (illustrated in FIG. 2). A computing device 105 in the vehicle 101 generally receives collected data 115 from one or more data collectors 110, and further includes an autonomous driving module 106, e.g., as a set of instructions stored in a memory of, and executable by a processor of, the computing device 105.

In general, collected data 115 may be used by the vehicle 101 computer 105 to make determinations concerning vehicle 101 operations, including autonomous operations of the vehicle 101. For example, collected data 115 may indicate a hazardous road condition, e.g., bumps, ice, low friction, etc., a construction zone, a "master stop" order received via a network 120, etc. The collected data 115 includes data concerning one or more markers 160, which data 115 may be used by the vehicle 101 computer 105 to make determinations concerning vehicle 101 operations, including autonomous operations of the vehicle 101.

For example, the markers 160 may convey information about a roadway 155 or portion thereof, possibly including rules for travel in such area of the roadway 155, e.g., that a vehicle 101 is nearing or in a construction zone, a special lane, e.g., a high-occupancy vehicle (HOV) lane, an area where a special or temporary speed limit is in force, an area where autonomous control of a vehicle 101 is prohibited, an area where autonomous control of a vehicle 101 is permitted and/or required, an area where a normal traffic direction has been reversed, etc. Markers 160 may provide information via a variety of mechanisms, such as a pattern of blocks, dots, letters, numbers, etc., detectable by a camera data collectors 110, by a radio frequency (RF) signal detectable by a radio data collector 110, etc.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. For example, the computer 105 generally includes, and is capable of executing, instructions to select an autonomous operation mode, to adjust an autonomous operation mode, to change an autonomous operation mode, etc., of the vehicle 101.

Further, the computer 105 may include more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure.

In addition, the computer 105 may be configured for communicating with the network 120, which, as described below, may include various wired and/or wireless networking technologies, e.g., cellular, Bluetooth, wired and/or wireless packet networks, etc. Further, the computer 105, e.g., in the module 106, generally includes instructions for receiving data, e.g., from one or more data collectors 110 and/or a human machine interface (HMI), such as an interactive voice response (IVR) system, a graphical user interface (GUI) including a touchscreen or the like, etc.

Generally included in instructions stored in and executed by the computer 105 is an autonomous driving module 106. Using data received in the computer 105, e.g., from data collectors 110, the server 125, etc., the module 106 may control various vehicle 101 components and/or operations without a driver to operate the vehicle 101. For example, the module 106 may be used to regulate vehicle 101 speed, acceleration, deceleration, steering, distance between vehicles and/or amount of time between vehicles, lane-change minimum gap between vehicles, left-turn-across-path minimum, time-to-arrival, intersection (without signal) minimum time-to-arrival to cross the intersection, etc.

Data collectors 110 may include a variety of devices. For example, various controllers in a vehicle may operate as data collectors 110 to provide collected data 115 via the CAN bus, e.g., collected data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Data collectors 110 could also include sensors or the like, e.g., medium-range and long-range sensors, for detecting, and possibly also obtaining information from, markers 160, e.g., as described further below, as well as other conditions outside the vehicle 101. For example, sensor data collectors 110 could include mechanisms such as radios, RADAR, lidar, sonar, cameras or other image capture devices, that could be deployed to detect markers 160 and/or obtain other collected data 115 relevant to autonomous operation of the vehicle 101, e.g., measure a distance between the vehicle 101 and other vehicles or objects, to detect other vehicles or objects, and/or to detect road conditions, such as curves, potholes, dips, bumps, changes in grade, etc.

A memory of the computer 105 generally stores collected data 115. Collected data 115 may include a variety of data collected in a vehicle 101 from data collectors 110, including data 115 obtained from one or more markers 160. Examples of collected data 115 are provided above and below, e.g., with respect to markers 160, and moreover, data 115 may additionally include data calculated therefrom in the computer 105. In general, collected data 115 may include any data that may be gathered by a collection device 110 and/or computed from such data. Accordingly, collected data 115 could include a variety of data 115 related to vehicle 101 operations and/or performance, as well as data related to in particular relating to motion of the vehicle 101. For example, in addition to data 115 obtained from a marker 160 such as discussed below, collected data 115 could include data concerning a vehicle 101 speed, acceleration, braking, lane changes and or lane usage (e.g., on particular roads and/or types of roads such as interstate highways), average distances from other vehicles at respective speeds or ranges of speeds, and/or other data 115 relating to vehicle 101 operation.

The network 120 represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 received from one or more vehicles 101.

Further, the server 125 could be used to configure one or more markers 160. For example, a marker 160 could include an RF transmitter, as mentioned above. The server 125 could be in communication with the marker 160 via the network 120, and could provide a message or messages to be transmitted by the marker 160. For example, a marker 160 could be located proximate to an area of a roadway 155 where a speed limit may be changed. Further, one or more markers 160 could be virtual, i.e., information supplied by a supplied to a vehicle 101 by communication from a server 125 and/or another vehicle 101.

In any case, for a physical or a virtual marker 160, the server 125 could be used to indicate various information, such as a speed limit that the marker 160 should communicate for reception by radio data collectors 110 in vehicles 101. Likewise, the server 125 could configure an electronic road sign or the like serving as a marker 160, e.g., to indicate presence of emergency workers, construction workers, law enforcement personnel, etc. Various instructions that the server 125 could transmit to one or more markers 160 could be stored in the data store 130. For example, the server 125 could be configured to send instructions to configure a message provided by a marker 160 based on a time of day, a weather condition, a flag in the data store 130 indicating a construction zone, accident zone, etc. associated with the marker 160, etc. Alternatively or additionally, an example of a virtual marker includes the server 125 communicating GPS data, i.e., a latitude and longitude, where a construction zone begins.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 including with a vehicle computer 105. A user device 150 could communicate with a vehicle 101 computer 105 the other mechanisms, such as a network in the vehicle 101, via known protocols such as Bluetooth, etc. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide a human machine interface (HMI) to the computer 105.

As seen in FIG. 2, one or more markers 160 may be proximate to a roadway 155. In this context, the meaning of "proximate" includes being embedded or fixed in, or being located on or above, e.g., on a post within a few feet of, a surface of a roadway 155 or a surface near a roadway 155, e.g., on, near, or adjacent to a roadway 155 shoulder, etc. Further, a marker 160 could be proximate to a roadway 155 by being suspended above the roadway 155, e.g., on a side or underside of a bridge, on a structure configured to suspend signs over the roadway, etc. In general, for a marker 160 to be proximate to a roadway 155 means that the marker 160 is located such that the marker 160 is detectable by one or more data collectors 110 in a vehicle 101 traversing the roadway 155 with respect to which the marker 160 is proximate.

In general, two kinds of markers 160 are possible in the context of the system 100: active markers 160 and passive markers 160. An active marker 160, e.g., a radio transponder, a virtual marker, etc., actively sends information to be received by a data collector 110 and may also be configured to receive information via the network 120, and/or transmit this information continuously or upon request for information by a computing device 105. A passive marker 160, e.g., a road sign, provides information to be detected and read by a data collector 110, but the passive marker 160 is not capable of taking action to initiate a communication with the data collector 110.

As stated above, markers 160 may provide information via a variety of mechanisms, such as a pattern of blocks, dots, letters, numbers, etc., detectable by a camera data collectors 110, by a radio frequency (RF) signal detectable by a radio data collector 110, etc. Accordingly, a marker 160 can be a sign, paint or etching in a roadway 155, or the like, configured to be read by a camera data collector 110, lidar, etc., and/or could include a radio device or the like for sending signals to a radio data collector 110. Further, a marker 160 could include a magnet or other material configured to be detected by a sensor data collector 110.

In some cases, a marker 160 may be temporarily placed proximate to a roadway 155. For example, in a construction zone and/or prior to a place where a construction zone begins on a roadway 155, one or more markers 160 may be used to indicate the presence of the construction zone and/or changes to the roadway 155. For example, in or near a construction zone of a roadway 155, one or more lanes of the roadway 155 may become unavailable, a roadway 155 shoulder may become unavailable, a speed limit may change, lanes may shift, etc. Likewise, law enforcement and/or rescue personnel may use temporary markers 160 to indicate the presence of an accident, hazardous road conditions such as icing, flooding, etc.

Exemplary Process Flows

Figure 3:
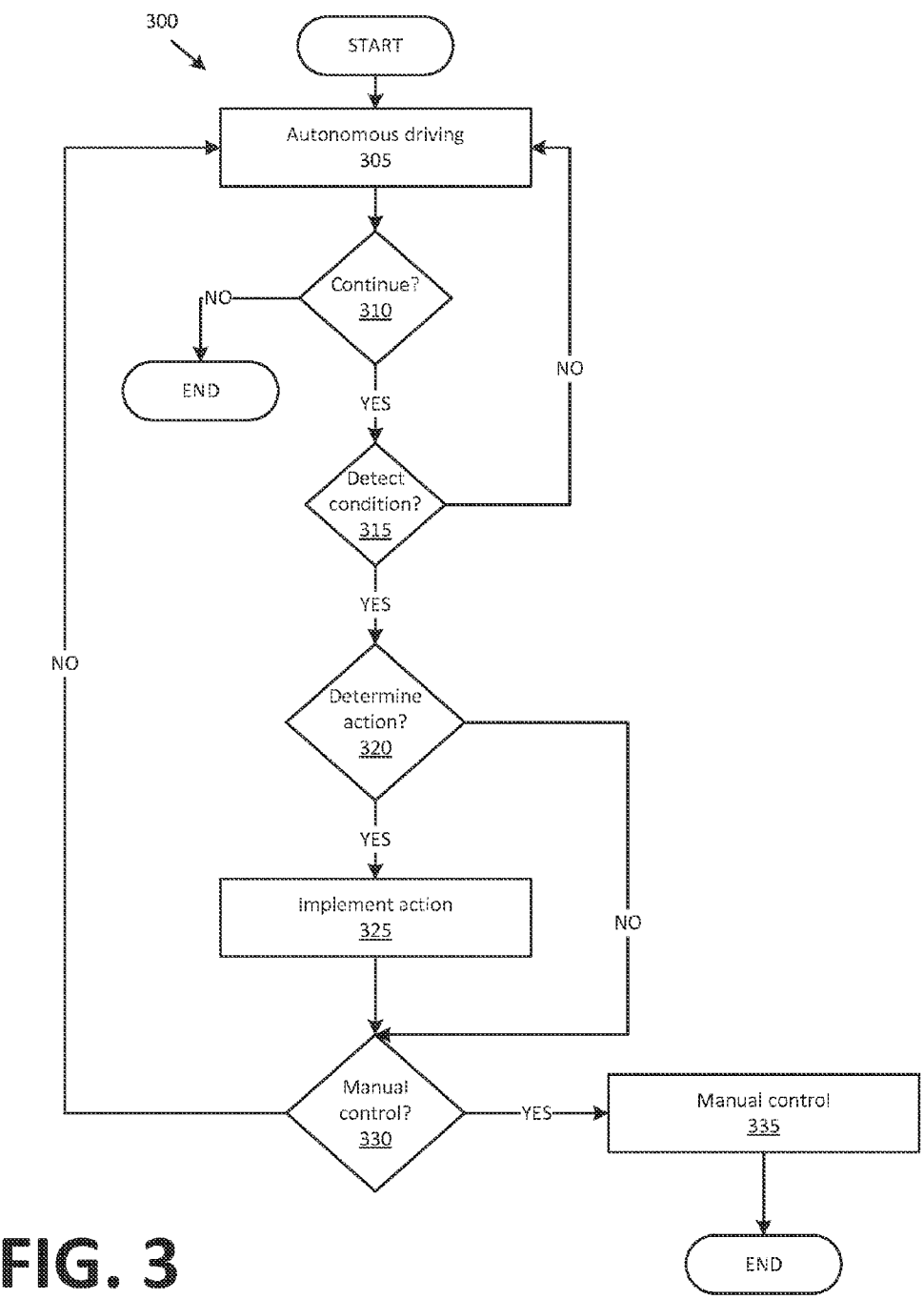
FIG. 3 is a diagram of an exemplary process for an autonomous vehicle sensing system in an autonomous mode.

FIG. 3 is a diagram of an exemplary process for an autonomous vehicle 101 sensing system using marker objects in an autonomous mode.

The process 300 begins in a block 305, in which a vehicle 101 conducts autonomous driving operations. That is, the vehicle 101 is operated partially or completely autonomously, i.e., a manner partially or completely controlled by the autonomous driving module 106, which may be configured to operate the vehicle 101 according to collected data 115. For example, all vehicle 101 operations, e.g., steering, braking, speed, etc., could be controlled by the module 106 in the computer 105. It is also possible that, in the block 305, the vehicle 101 may be operated in a partially autonomous (i.e., partially manual, fashion, where some operations, e.g., braking, could be manually controlled by a driver, while other operations, e.g., steering, could be controlled by the computer 105. Further, it is possible that the process 300 could be commenced at some point after vehicle 101 driving operations begin, e.g., when manually initiated by a vehicle occupant through a user interface of the computer 105. In some implementations of the system 100, a vehicle 101 operates in an autonomous or semi-autonomous mode only where markers 160 indicate that the vehicle 101 may do so, e.g., that the vehicle 101 is in a zone or area where autonomous operation, or at least certain autonomous operations constituting semi-autonomous operation of the vehicle 101, is permitted.

In the block 310, the computer 105 determines whether the process 300 should continue. For example, the process 300 may end if autonomous driving operations end and a driver resumes manual control, if the vehicle 101 is powered off, etc. In any case, if the process 300 should not continue, the process 300 ends following the block 310. Otherwise, the process 300 proceeds to a block 315.

In the block 315, the computer 105 determines whether any data 115 indicating an anomalous, changed, and/or particular condition is detected according to collected data 115. Examples of data 115 indicating such a condition include:

Restricted lane: possibly using marker objects 160, discussed in more detail above and below, but also according to a detected marking on the roadway 155, a captured image of a sign, a barrier, etc., collected data 115 may indicate that a roadway 155 lane is restricted from travel by all vehicles 101, e.g., because of construction, is "HOV," i.e., available only to vehicles 101 carrying two or more, three or more, etc. passengers, permits a direction of travel only for a specified time or times of day, is limited to certain types of vehicles 101, e.g., without trailers, having no more than two axles, etc.

Restricted zone: in addition to detecting that one or more lanes of a roadway 155 are restricted from travel, e.g., as described in the preceding paragraph, data 115 and/or data received from the server 125, could indicate that an entire portion of a roadway 155, a certain geographic area, e.g., defined according to latitude and longitude geo-coordinates, etc., was restricted from travel, or was subject to limitations, e.g., special speed limit, limitations to emergency vehicles 101 or other types of vehicles 101, such as four-wheel drive or all-wheel drive vehicles 101, vehicles 101 where some or all vehicle 101 operations are conducted autonomously, etc. For example, weather conditions, environmental hazards such as chemical spills, fires, etc., could make a roadway 155 and/or geographic zone dangerous for travel. Accordingly, the server 125 and/or messages from another vehicle 101 could indicate that a roadway 155 and/or geographic zone was restricted or limited for travel.

A restricted zone could be indicated by one or more markers 160, use of which is discussed further below with respect to FIGS. 4 and 5. For example, a restricted zone could include a construction site. The construction site could be indicated by one or more markers 160. However, a construction site could also be determined according to collected data 115 relating to signs, barriers, roadway 155 markings, etc. indicating a construction site. Further, a construction site could be indicated in one or more messages from another vehicle 101 and/or information provided to a vehicle 101 from the server 125.

Incline detection: data 115, e.g., detecting a vehicle 101 level, change in altitude, providing a vehicle 101 location on a map where a topography is known, etc., may indicate that a vehicle 101 is traversing a portion of the roadway 155 that includes a steep and/or long incline (i.e., uphill travel) or decline (i.e., downhill travel).

Road surface detection: data 115 may indicate a change in a roadway 155 surface and/or a roadway 155 surface potentially presenting a danger condition. For example, data 115 relating to braking, acceleration, traction control, etc., as well as data 115 from sensor data collectors 110 such as radar, lidar, cameras, etc., may indicate that a roadway 155 is rough and/or uneven, and/or dangerously covered or coated, e.g., icy, wet, oil covered, etc.

Marker detection: as described further below with respect to the process 400, a detected marker 160 could indicate a condition warranting action by the computer 105.

If no anomalous, changed, and/or particular condition (collectively, a "notable condition") is detected in the block 315, then the process 300 returns to the block 305. Otherwise, following the block 315, in a block 320, the computer 105 attempts to determine an action for the vehicle 101 based on a condition or conditions detected as described above with respect to the block 315. If an action or actions can be determined, then a block 325 is executed next. Otherwise, the process 300 proceeds to a block 330.

Examples of actions that may be determined in the block 320 may relate to the exemplary conditions discussed above with respect to the block 315. For example, if one or more restricted lanes are detected in a roadway 155, then the computer 105 may determine that the vehicle 101 should maintain a lane, change lanes, exit a roadway 155, etc.

Likewise, if a restricted zone is detected, the computer 105 may determine one or more actions for the vehicle 101.

For instance, if the restricted zone is detected according to information from the server 125, the server 125 may further provide a "Master Stop" instruction or the like, i.e., an instruction for all vehicles 101, or at least vehicles 100 one of a certain type, e.g., non-autonomous, non-emergency, etc., to stop operations. Further, the server 125 may provide instructions concerning how to stop operations, e.g., slow and pull to the side of a roadway 155, proceed to an intersection or exit to leave the roadway 155, etc. In addition, if collected data 115 indicates a restricted zone, the computer 105 may determine an appropriate course of action, e.g., traveling around the restricted zone, stopping and pulling to a side of a roadway, etc. Moreover, where a particular type of restricted zone is detected, e.g., a construction area, the computer 105 could conduct vehicle 101 operations appropriately, e.g., by observing speed limits appropriate for a construction area, changing lanes, or even handing off full manual control to a vehicle 101 operator.

In the example where a steep and/or long incline or decline is detected, e.g., a vertical rise over a horizontal distance exceeds a predetermined threshold, the computer 105 may take action to adjust vehicle 101 powertrain settings, e.g., to improve braking, engine performance, electrical charging performance, etc. for example, where a vehicle 101 is likely to traverse a relatively long down-hill portion of the roadway 155, the computer 105 could command vehicle 101 powertrain settings for selecting a lower gear in a vehicle 101 transmission, thereby preventing or mitigating the phenomenon known as brake fade. Likewise, an electric-powered vehicle 101 could use slope information to adjust a charging mechanism taking into account a length and slope of a hill.

In the example where an anomalous road surface condition is detected, the computer 105 may determine an action appropriate for the detected condition. For example, if a roadway 155 is detected to be wet, speed adjustments may be appropriate for reduced friction, or the likelihood that an uneven road surface, e.g., potholes, may not be detected because they are filled with water. Likewise, a roadway 155 covered with ice, snow, etc. may have reduced friction and/or cover unevenness. Certain unevenness may be detected according to collected data 115 relating to other vehicles 101, e.g., a presence and size of a pothole or the like may be determined by detecting a splash of water from a second vehicle 101 driving through the pothole. In any event, modifications to vehicle 101 speed, direction, suspension settings, etc., may be appropriate depending on a road surface condition.

The example of taking action in an autonomous or semi-autonomous vehicle 101 based on one or more markers 160 is discussed further below with respect to the process 400.

Continuing with the process 300, if no notable condition is detected, then the process returns to the block 305. Otherwise, in a block 325, an action determined in the block 320 is implemented. The process 300 then proceeds to a block 330.

It should be noted that the computer 105 may determine an autonomous action for a vehicle 101, e.g., braking, speed control, turning, etc. However, the computer 105 may further determine, in the block 330, to return full manual control of the vehicle 101 to the human operator where the vehicle 101 is being operated fully or semi-autonomously. For example, road conditions could be too hazardous for autonomous travel, the server 125 could have provided a message to cease autonomous or semi-autonomous operations, confidence in sensor data collectors 110 could be below a predetermined threshold, etc. Accordingly, in the block 330, the computer 105 determines whether manual control of the vehicle 101 should be returned to a human operator. If so, the block 335 is executed next. Otherwise, the process 300 returns to the block 305.

In the block 335, the computer 105 ceases autonomous and/or semi-autonomous operations of the vehicle 101.

Following the block 335, the process 300 ends.

Figure 4:
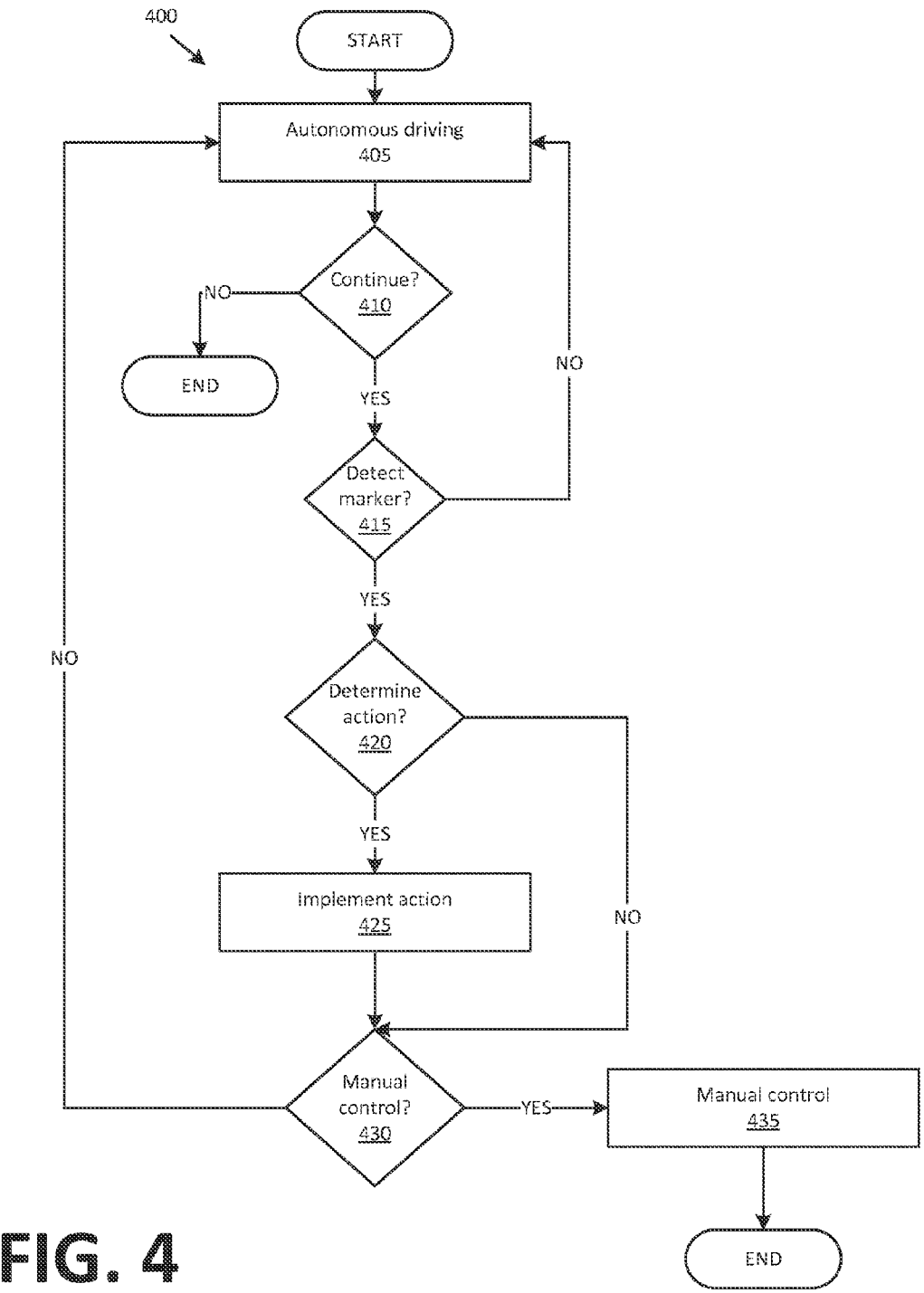
FIG. 4 is a diagram of an exemplary process for an autonomous vehicle sensing system using marker objects in an autonomous mode.

FIG. 4 is a diagram of an exemplary process for an autonomous vehicle 101 sensing system using marker objects 160 in an autonomous mode.

The process 400 begins in a block 405, in which a vehicle 101 conducts autonomous driving operations, e.g., as described above concerning the block 305 in the process 300.

In the block 410, the computer 105 determines whether the process 400 should continue. For example, the process 400 may end if autonomous driving operations end and a driver resumes manual control, if the vehicle 101 is powered off, etc. In any case, if the process 400 should not continue, the process 400 ends following the block 410. Otherwise, the process 400 proceeds to a block 415.

In the block 415, the computer 105 determines whether one or more markers 160 have been detected. As described above, data collectors 110 provide collected data 115 to the computer 105. The computer 105 is configured to analyze the collected data 115 to determine whether presence of a marker 160 is indicated. For example, collected data 115 could include data received in an RF transmission, image data 115 from a sign marker 160, etc. If a marker 160 has been detected, then the process 400 proceeds to a block 420. Otherwise, the process 400 returns to the block 405.

In the block 420, the computer 105 determines whether information received from the one or more markers 160 detected in the block 415 warrants an action by the vehicle 101. That is, to determine whether to take action based on a marker 160 in the context of the process 400, the computer 105 must not only detect the marker 160, but must also obtain information, e.g., interpret collected data 115, from the marker 160. As mentioned above, such information can be provided via a variety of mechanisms, e.g., RF transmission from the marker 160, a pattern of dots, bars, or other shapes on a marker 160, etc.

By such mechanisms, a variety of information may be provided from a marker 160 that may be used by the computer 105 to determine whether an action in or by the vehicle 101 is warranted. For example, a marker 160 can provide information concerning a speed limit change, a reduction in number of available lanes, hazardous road conditions such as icing or flooding, etc. Accordingly, upon receiving such information, the computer 105 may determine that action is appropriate, e.g., reducing speed to conform to a speed limit, changing lanes, slowing to an appropriate speed for possible flood conditions, changing a distance between the vehicle 101 and another vehicle, etc. However, in some instances, the computer 105 may determine that, although a marker 160 has been detected, no action is warranted. For example, a marker 160 may indicate a speed limit change, or unavailability of a particular lane in a roadway, where a vehicle 101 is traveling under the new speed limit, in an available lane, etc. If an action is warranted based on the one or more detected markers 160, then the process 400 proceeds to a block 425. Otherwise, the process 400 proceeds to a block 430.

In the block 425, the computer 105 implements the action determined in the block 420. For example, a speed, distance from other vehicles, lane of travel, etc., may be adjusted as described above.

In the block 430, which may follow either of the block 420 or 425, the computer 105 determines whether to transition the vehicle 101 to manual control. Such transition may be determined according to user input, but alternatively or additionally the computer 105 could be configured to return the vehicle 101 to manual control of an operator based on one or more detected markers 160. For example, if a detected marker 160 indicates that the vehicle 101 is approaching a construction zone, accident area, etc., the computer 105 could be configured to transition the vehicle 101 to manual control. If manual control is to be resumed, the process 400 proceeds to a block 435. Otherwise, the process 400 returns to the block 405.

In the block 435, the computer 105 transitions the vehicle 101 to manual control. For example, the computer 105 may use a human machine interface (HMI) or the like such as mentioned above to alert a vehicle 101 operator that manual control is being implemented, and may cease autonomous or semi-autonomous operations upon indication of acceptance of manual control by the vehicle 101 operator. Following the block 435, the process 400 ends. When the process 400 ends following the block 435, it is possible that the process 500, discussed below, in which the vehicle 101 is operated manually, may commence.

Figure 5:
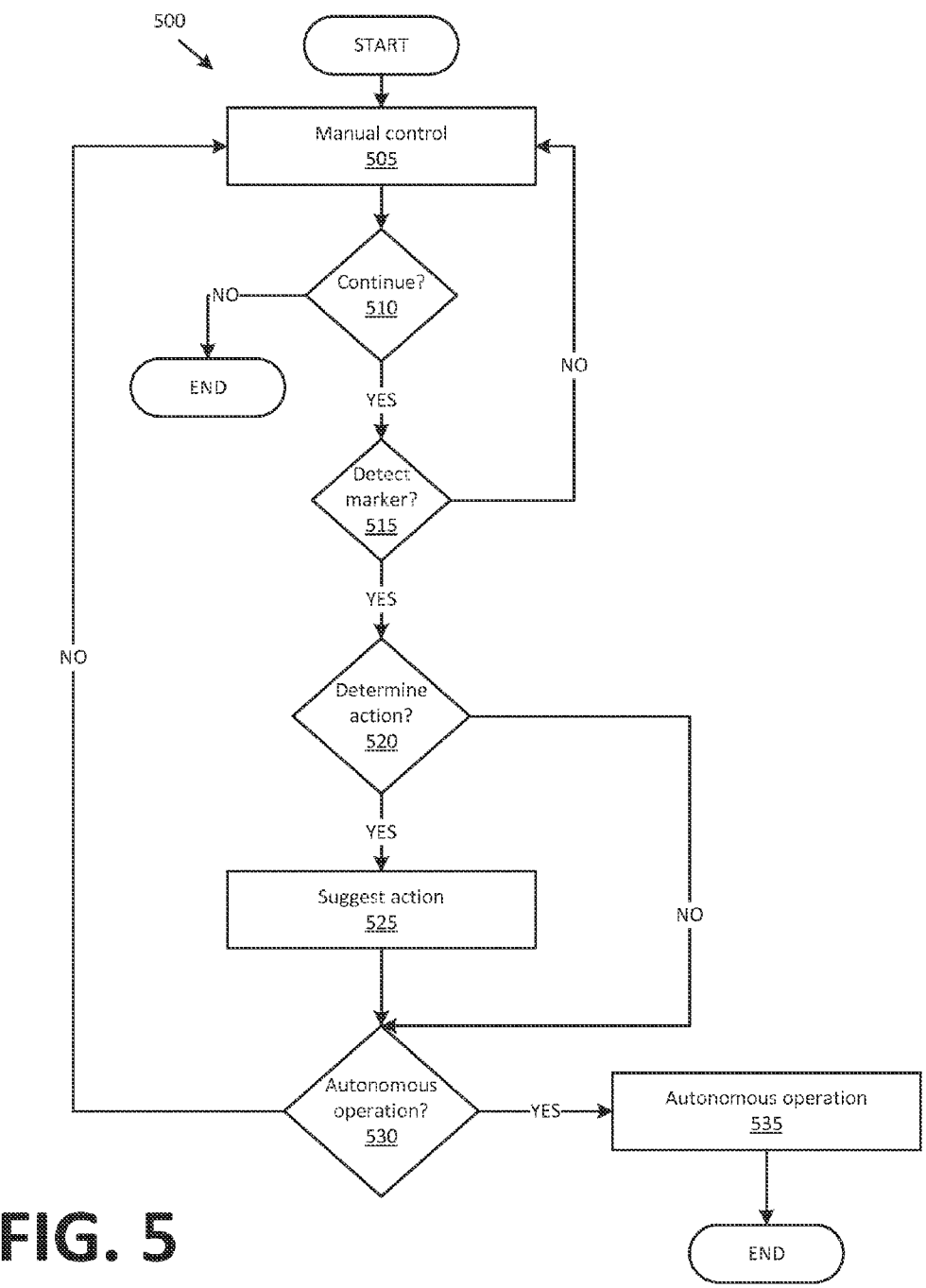
FIG. 5 is a diagram of an exemplary process for an autonomous vehicle sensing using marker objects system in a manual mode.

FIG. 5 is a diagram of an exemplary process for an autonomous vehicle 101 sensing system using marker objects 160 in a manual mode. A vehicle 101 may be in a manual mode due to an operator selection, limited capabilities of the vehicle 101, indications from marker objects 160, etc. For example, in one implementation of the system 100, a vehicle 101 is in a manual mode unless it detects marker objects 160 indicating that the vehicle 101 may be in a semi-autonomous or autonomous mode. In any case, the process 500 begins in a block 505, in which a vehicle 101 is operated manually, i.e., in a conventional manner by a human operator.

In the block 510, the computer 105 determines whether the process 500 should continue. For example, the computer 105 may receive input to initiate autonomous operations. In any case, if the process 500 should not continue, the process 500 ends following the block 510, whereupon it is possible that the process 500, described above, may be initiated. Otherwise, the process 500 proceeds to a block 515.

In the block 515, in a manner similar to the block 415 described above, the computer 105 determines whether one or more markers 160 have been detected. If a marker 160 has been detected, then the process 500 proceeds to a block 520. Otherwise, the process 500 returns to the block 505.

In the block 520, the computer 105 determines whether information received from the one or more markers 160 detected in the block 515 warrants an action by the vehicle 101, e.g., in a similar fashion as described above concerning the block 420. If an action is warranted based on the one or more detected markers 160, then the process 500 proceeds to a block 525. Otherwise, the process 500 proceeds to a block 530.

In the block 525, the computer 105 suggests the action determined in the block 520, e.g., according to an HMI such as described above. For example, adjusting a speed, distance from other vehicles, lane of travel, etc., may be recommended via an HMI message, e.g., textual on a display, audio, etc.

In the block 530, which follows the block 525, the computer 105 determines whether to transition the vehicle 101 to autonomous control. Such transition may be determined according to user input, but alternatively or additionally the computer 105 could be configured to place the vehicle 101 under autonomous or semi-autonomous control based on one or more detected markers 160. For example, if a detected marker 160 indicates that the vehicle 101 is approaching a construction zone, accident area, etc., the computer 105 could be configured to control the speed of the vehicle 101 and/or vehicle 101 steering. Moreover, where the block 530 is reached following the block 520, the computer 105 may simply determine whether autonomous or semi-autonomous control is appropriate according to a variety of bases, e.g., collected data 115, user input, etc. If autonomous control is to be resumed, the process 500 proceeds to a block 535. Otherwise, the process 500 returns to the block 505.

In the block 535, the computer 105 transitions the vehicle 101 to autonomous or semi-autonomous control. For example, the computer 105 may use a human machine interface (HMI) or the like such as mentioned above to alert a vehicle 101 operator that autonomous are semi-autonomous control is being implemented, and may cease manual or semi-manual operations upon indication of acceptance of autonomous control by the vehicle 101 operator. Alternatively, the computer 105 could simply implement an action autonomously, e.g., braking, acceleration, steering, activating exterior lights on the vehicle 101, etc. Following the block 535, the process 500 ends. When the process 500 ends following the block 535, it is possible that the processes 300 and/or 400, discussed above, in which the vehicle 101 is operated autonomously, may commence.

Conclusion

Computing devices such as those discussed herein generally each include instructions executable by one or more computing devices such as those identified above, and for carrying out blocks or steps of processes described above. For example, process blocks discussed above are embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in a vehicle configured to:
   detect a passive marker proximate to a roadway;
   detect an active marker that is also proximate to the roadway and that includes a radio transponder that provides information about the roadway at a location of the active marker;
   obtain data from the passive and active markers; and
   implement at least one autonomous action based on the data;
   wherein the data indicates at least one of a restricted lane, a construction zone, an accident area, an incline, a hazardous road surface.

2. The system of claim 1, wherein the at least one autonomous action is at least one of altering a speed of the vehicle, controlling vehicle steering, controlling vehicle lighting, transitioning the vehicle to manual control, and controlling a distance of the vehicle from an object.

3. The system of claim 1, wherein the data is provided from the physical marker via at least one of a radiofrequency transmission, a camera image, and lidar.

4. The system of claim 1, wherein the computer is further configured to detect at least one second physical marker proximate to the roadway, and to obtain data from each of the markers.

5. The system of claim 1, wherein the data further indicates a restricted zone.

6. A method, implemented in a computer configured to operate a vehicle:
   detecting a passive marker proximate to a roadway;
   detecting an active marker that is also proximate to the roadway and that includes a radio transponder that provides information about the roadway at a location of the active marker;
   obtaining data from the passive and active markers; and
   implement at least one autonomous action based on the data;
   wherein the data indicates at least one of a restricted lane, a construction zone, an accident area, an incline, a hazardous road surface.

7. The method of claim 6, wherein the at least one autonomous action is at least one of altering a speed of the vehicle, controlling vehicle steering, controlling vehicle lighting, transitioning the vehicle to manual control, and controlling a distance of the vehicle from an object.

8. The method of claim 6, wherein the data is provided from the physical marker via at least one of a radiofrequency transmission, a camera image, and lidar.

9. The method of claim 6, further comprising detecting at least one second physical marker proximate to the roadway, and obtaining data from each of the markers.

10. The method of claim 6, wherein the data further indicates a restricted zone.

11. The system of claim 1, wherein the physical marker is one of a plurality of physical markers proximate to the roadway.

12. The method of claim 6, wherein the physical marker is one of a plurality of physical markers proximate to the roadway.

13. The system of claim 1, further comprising a virtual marker that consists of wireless communications from one of a second vehicle and a remote server.

14. The method of claim 6, further comprising detecting a virtual marker that consists of wireless communications from one of a second vehicle and a remote server.

15. The system of claim 13, wherein the passive marker lacks a radio transponder.

16. The method of claim 14, wherein the passive marker lacks a radio transponder.

17. The system of claim 1, wherein the passive marker lacks a radio transponder.

18. The method of claim 6, wherein the passive marker lacks a radio transponder.

19. The system of claim 5, wherein the computer is further configured to receive, from the radio transponder in the active marker, the data.

20. The method of claim 10, further comprising receiving, from the radio transponder in the active marker, the data.

* * * * *